United States Patent
O'Connor et al.

(10) Patent No.: US 6,812,466 B2
(45) Date of Patent: Nov. 2, 2004

(54) INFRARED OBSTACLE DETECTION IN THE PRESENCE OF SUNLIGHT

(75) Inventors: Christopher J. O'Connor, Northville, MI (US); James D. Davis, Jr., Wixom, MI (US); Todd R. Vernaz, Farmington Hills, MI (US); Stephen A. Hawley, Sarasota, FL (US)

(73) Assignee: Prospects, Corp., Novi, MI (US)

( * ) Notice: Subject to any disclaimer, the term of this patent is extended or adjusted under 35 U.S.C. 154(b) by 36 days.

(21) Appl. No.: 10/255,143

(22) Filed: Sep. 25, 2002

(65) Prior Publication Data

US 2004/0056199 A1 Mar. 25, 2004

(51) Int. Cl.$^7$ ................................................. G01J 5/02
(52) U.S. Cl. ................................................. 250/341.1
(58) Field of Search .......................... 250/341.1, 341.8, 250/214 AL, 214 BC, 214 DC; 340/555

(56) References Cited

U.S. PATENT DOCUMENTS

| | | | |
|---|---|---|---|
| 4,733,081 A | 3/1988 | Mizukami | 250/341 |
| 5,675,150 A * | 10/1997 | Kunz | 250/341.1 |
| 5,684,294 A | 11/1997 | Kouhi | 250/214 |
| 6,157,024 A | 12/2000 | Chapdelaine et al. | 250/221 |
| 6,455,839 B1 | 9/2002 | O'Connor et al. | 250/221 |
| 6,518,561 B1 * | 2/2003 | Miura | 250/221 |

* cited by examiner

Primary Examiner—Constantine Hannaher
(74) Attorney, Agent, or Firm—Weingarten, Schurgin, Gagnebin & Lebovici LLP

(57) ABSTRACT

In an infrared obstruction detection system, an apparatus is used to detect the presence of ambient light and initiate compensation to minimize the effects of the ambient light on the performance of the system. In one embodiment, the magnitude of the ambient light is measured and an offset proportional to that magnitude is fed to the obstruction detection system such that the data indicative of an obstacle are not obscured. In another embodiment, the apparatus continually monitors the effect of ambient light and adjusts the obstacle detection information during the changing states of the ambient light detected.

24 Claims, 14 Drawing Sheets

INFRARED OBSTACLE DETECTION IN THE PRESENCE OF SUNLIGHT

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

Photodetectors allow monitoring of a volume of space without blocking the use of that space. Indoors, photodetectors have been used in security applications to detect the presence of unauthorized persons. The use of photodetectors outdoors has been somewhat limited because it can be difficult to distinguish a feature from the natural variations in ambient light caused by changes in sunlight or the orientation of the monitored volume to the sunlight. Ways to overcome the difficulties in using photodetectors outdoors have included filtering, use of regions of the electromagnetic spectrum not affected by sunlight, and imparting unique characteristics to the light being used in the system.

Infrared (IR) sensoring techniques offer many advantages for products that have automotive, industrial and retail applications. However, many of these systems must operate in the presence of sunlight, which has the potential to significantly reduce the performance of the IR sensor. Thus, there is a great need to identify the presence of sunlight or other interfering ambient light and provide corrective techniques to reduce or eliminate the impact of the sunlight on the performance of the IR sensor.

Closures for apertures such as vehicle windows, sunroofs and sliding doors are now commonly motor driven. As a convenience, power windows are frequently provided with control features for the automatic closing and opening of an aperture following a simple short command, commonly known as an "express close" feature. For instance, a driver's side window may be commanded to rise from any lowered position to a completely closed position simply by momentarily elevating a portion of a window control switch, then releasing the switch. Alternatively, automatic closing and opening of an aperture may be in response to input from a separate device, such as a rain or temperature sensor. Such automated aperture closing features may also be utilized in various other home or industrial settings.

While the features described above provide added convenience, they may also introduce a safety hazard. Body parts or inanimate objects may be present within an opening when a command is given to automatically close the window or door. For example, an automatic window-closing feature may be activated due to rain impinging on an interconnected rain sensor while a pet has its head thorough the window. A further example includes a child who has placed its head through the opening of a window or sunroof that is activated to close by the driver, another passenger or accidentally by the child.

Systems have been developed to avoid potentially tragic accidents or property damage involving intervening objects trapped by power windows or sunroofs. These systems, using contact methodologies, typically detect the circumstance in which a window has been commanded to express close when it should not. Complete closure is prevented whenever an intervening object such as a finger or arm extended through the opening contacts the safety system during closure. In further refinements of the closure safety system, the closure member, such as the window, is not required to come into contact with the intervening object for the object to be detected.

When sunlight can be disregarded, such contactless object detection systems typically measure the magnitude of a reflected signal to determine whether an intervening object is present. A photo-emitter emits a light beam, which an optical system directs across the opening that is being monitored. An unobstructed opening may result in the reflection of at least a portion of the emitted beam from the opposing side of the aperture. The reflection from the opposing side ordinarily results in a reflected signal of a well-defined intensity being returned to a receiver. A photo-receiver disposed in an appropriate location receives the reflected light beam and generates an output signal indicative of the intensity of the reflected beam. An intervening object located in the path of the light beam changes the intensity of the reflected light beam, a condition reflected in the receiver output signal. The receiver output signal therefore can be used to differentiate between the opening with an object through it and the opening unobstructed.

These optical systems, however, are vulnerable to interference by ambient light, especially sunlight. Prior art systems for coping with sunlight have included the use of synchronous detectors and "judgment circuits" consisting of a number of logic circuits coupled together. These judgment circuits, however, may still be susceptible to interfering sunlight and typically include several functional blocks, each of which contains several digital logic circuits. The large number of parts associated with the judgment circuits can increase both the power that is consumed and dissipated as heat and the cost associated with the object detection circuitry.

An improved way to cancel the portion of a signal that is associated with sunlight, while maintaining the intelligibility of the portion of the signal associated with an obstacle, is needed. Preferably, such an apparatus will provide enhanced accuracy by reducing the effect of the interfering ambient light while using fewer parts and consuming less power than the prior art.

BRIEF SUMMARY OF THE INVENTION

The present invention has particular application in systems providing an indication of the presence of an object within a pinch zone located in the path of an automated closure device such as a powered window, powered sunroof, or powered door or hatch. When an optical sensor incorporates a synchronous detection amplifier operating in the infrared (IR) range to selectively amplify the system light signal, the invention negates the effect of sunlight that could otherwise swamp the desired light or cause excess electronic noise.

The embodiments of the invention work in conjunction with methods and apparatus for sensing an object with an optical sensor. The optical sensor utilizes synchronous detection and an integrator to separate a desired optical signal from ambient light and electronic noise. Further, the system cancels modulated energy from features of the environment not associated with an object in the opening.

The sunlight compensating system functions with a system that includes a modulator driving a photo-emitter and a switched amplifier receiving first and second signals respectively. A photodetector receives a portion of light reflected from the pinch zone and/or an object therein and provides an optical detector signal to the switched amplifier.

The switched amplifier provides an output signal that includes a voltage that results from the difference between the optical detector signal and a reference signal multiplied by a gain that is dependent on the phase in the detection cycle. The gains and duration of the phases are selected to set the gain of the switched amplifier to an average value of zero when no modulated optical signal is present from the pinch zone and/or object therein.

The obstacle detection system further includes a means to electronically integrate the difference between the output of the switched amplifier and an adjustable reference voltage for a predetermined measurement time. A detector receives the integrator output signal and provides indicia of the presence or absence of an object within the pinch zone.

The obstacle detection system further includes a control element or controller that provides the means to monitor the degree of photodetector exposure to sunlight and then apply appropriate control signals that selectively optimize the system response and compensate for changes to the transfer function of some components.

In one embodiment the controller functionality may be implemented using a conventional microcontroller integrated circuit and the appropriate analog processing elements such as analog to digital converter (A/D), digital to analog converter (DAC), and digital to resistance converter, (RDAC). These elements may be part of the microcontroller functionality or may be implemented discretely. Alternate embodiments of the controller may be implemented using digital logic devices in conjunction with the analog processing elements enumerated above.

In one embodiment of the system, an optical source and optical detector are optically coupled to monitor a target area that reflects at least a portion of an optical signal. The optical detector detects a received optical signal having temporal characteristics allowing the received signal to be distinguished from ambient light. The optical detector provides a detector output signal indicative of one characteristic of the received optical signal to a conditioning circuit for outputting a digital output representative of the detector output signal. A controller for receiving the digital output from the conditioning circuit determines the magnitude of an ambient light-induced signal in the digital output and outputs a control signal to a second input of the conditioning circuit, that uses the second input as an error compensating offset.

In another embodiment, the optical object sensing apparatus capable of compensating for the effect of ambient light comprises an optical source and detector, a conditioning circuit, and a controller. The optical source and detector are optically coupled for monitoring a target area that reflects at least a portion of an optical signal for detection as a received optical signal. The optical detector provides a detector output signal indicative of one characteristic of the received optical signal. The conditioning circuit outputs a first digital output representative of the detector output signal and a second digital output representative of an integrated output signal. The controller receives the first and second digital outputs, and determines an effect of the ambient light on the integrated output signal from said first and second digital outputs. The controller also outputs a detection output.

When the sunlight dominates the incoming photocurrent such that the preamplifier is saturated, one embodiment of the sunlight compensating system outputs an offset, designed to bring the preamplifier out of saturation, to the detection system before determining the compensation based on the sunlight remaining in the incoming signal. Another embodiment uses a low-gain buffer to detect the magnitude of the sunlight-induced signal. The output of this buffer is used to bring the incoming signal into the range for the signal compensation.

One method for canceling the effect of ambient light in an optical object sensing apparatus comprises optically coupling an optical source and detector for monitoring a target area that reflects at least a portion of an optical signal for detection as a received optical signal. The optical detector provides a detector output signal indicative of one characteristic of the received optical signal. The optical object sensing apparatus outputs a digital output representative of the detector output signal from a conditioning circuit. The digital output from the conditioning circuit is received at a controller. The controller determines the magnitude of an ambient light-induced signal in said digital output and outputs a control signal to the conditioning circuit. The conditioning circuit adjusts the digital output to compensate for the ambient light-induced signal based on the control signal.

An alternate method for canceling the effect of ambient light on an optical object sensing system comprises optically coupling an optical source and detector for monitoring a target area that reflects at least a portion of an optical signal for detection as a received optical signal. The optical detector provides a detector output signal indicative of one characteristic of the received optical signal. A conditioning circuit receives the detector output signal and outputs a first digital output representative of the detector output signal and a second digital output representative of an integrated output signal. A controller adapted to determine an effect of the ambient light on the integrated output signal receives the first and second digital outputs and outputs a detection output based upon the first and second digital outputs.

In a further embodiment, a controller interprets the digital reading of ambient light intensity utilizing a previously measured relationship between the ambient light and the detector output. The controller then removes the effects of the ambient light from the detection system's digital output. Other aspects, features, and advantages of the present invention are disclosed in the detailed description that follows.

BRIEF DESCRIPTION OF THE SEVERAL VIEWS OF THE DRAWING

The invention will be more fully understood with reference to the following detailed description in conjunction with the drawings of which.

DETAILED DESCRIPTION OF THE INVENTION

The invention relates to a method and apparatus for detecting and compensating for sunlight in conjunction with an apparatus utilizing an IR sensor system. A sunlight compensation system functions within the context of a system utilizing an optical sensor system. Applicant's application Ser. No. 09/737,538 filed Dec. 15, 2000, and issued as U.S. Pat. No. 6,455,839 on Sep. 24, 2002 titled "OBSTACLE DETECTION SENSOR USING SYNCHRONOUS DETECTION", incorporated herein by reference, describes such a system.

In order to detect an obstacle in the presence of ambient light, a frequency or time-modulated infrared (IR) probe beam is used. In the present context, such modulation may be generically termed "temporal". A sensor then selectively amplifies the modulated portion of the total photocurrent that is received. Ambient light, particularly sunlight, may produce a photocurrent several orders of magnitude greater than that associated with the modulated IR beam. This in turn may have significant impact on the transfer function of the photodetector, causing the magnitude of the response to an obstacle of fixed size and reflectivity to vary with changes in the ambient light. Changes to the transfer function of the photodetector will cause the magnitude of the associated signal to change. This may be corrected by modifying the gain associated with any of the system amplifiers in a compensatory fashion.

In addition, in direct sunlight, the photocurrent may be sufficiently great to saturate the initial gain stage of the sensor thereby rendering it inoperable. Saturation of the initial gain stage may be corrected by injecting a DC current into a summing junction at the input to an initial gain stage to cancel out the sunlight-induced DC current.

The obstacle detection system includes an optical sensor that monitors a detection volume that includes a pinch zone. The definition of the pinch zone varies depending upon the nature of the automated closure device. When an automated closure device comprises a power-assisted, sliding closure member such as a power sunroof, a power window, or a power door, the pinch zone is defined by a leading edge of a closure member and the portion of the aperture where the leading edge of the closure member will meet a terminal portion of the aperture opening. In these cases, the pinch zone is generally a plane defined by an edge of the aperture approached by the leading edge of the door or hatch and the path of travel of the door or hatch.

Figure 1:
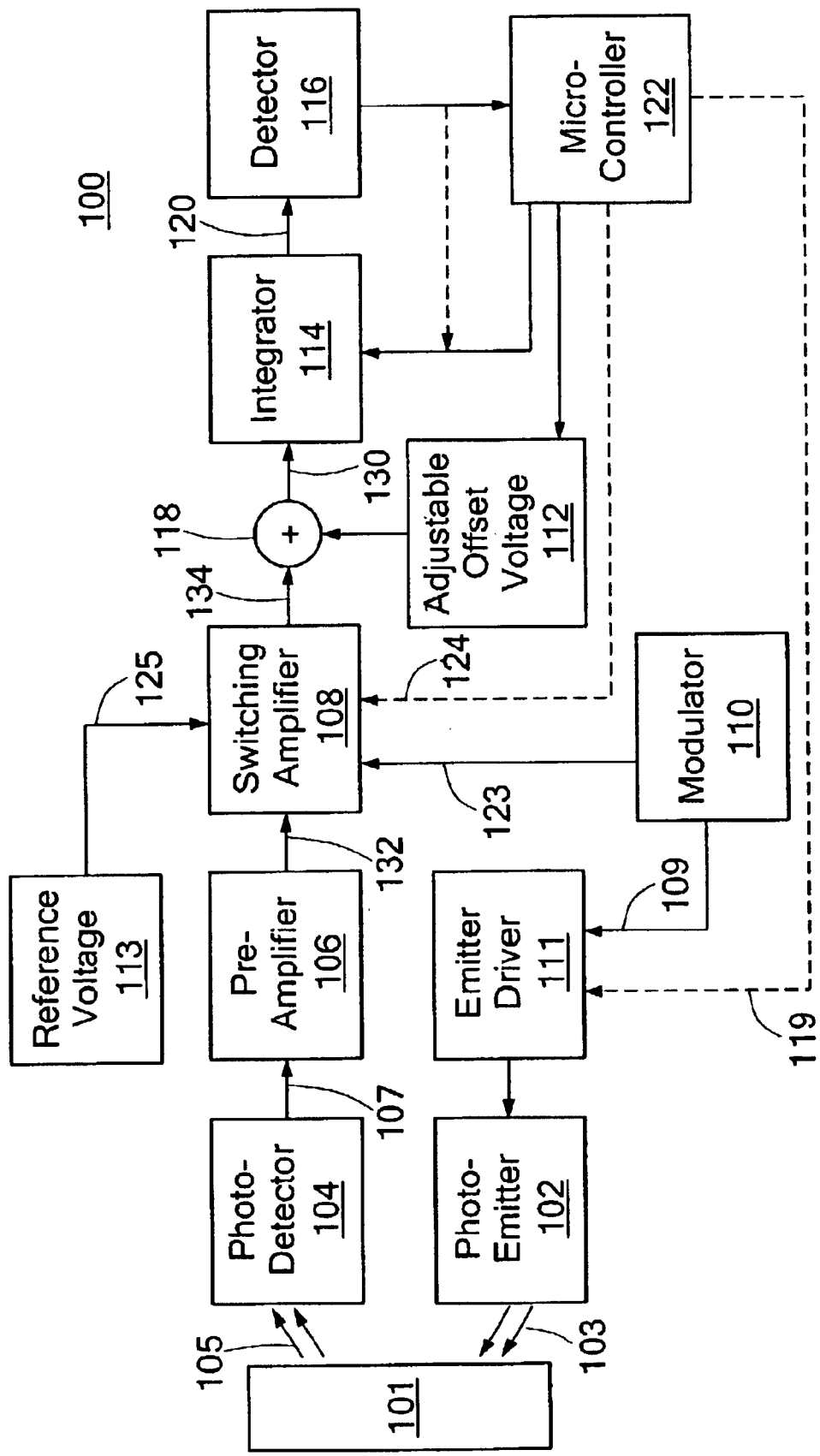
FIG. 1 is a block diagram of an optical sensing system in which the presently disclosed sunlight compensation technique can be employed.

When the optical system uses temporal variations in the optical sensor beam, a measurement period is used that is a predetermined period of time containing at least one active phase and at least one inactive phase. As used herein, an active phase is a period of time in which a photo-emitter provides illumination. Similarly, as used herein, an inactive phase is a period of time in which a photo-emitter does not provide illumination. The sensitivity of the detection scheme described increases with the duration of the measurement time. However, the application also requires that the measurement process occur with sufficient rapidity that movement of the window can be arrested without striking or entrapping any object between measurement cycles. In the embodiment of FIG. 1, the maximum measurement time required to detect the smallest obstacle of interest was set to 100 ms. It should be recognized that larger obstacles will provide an indication in less time.

The obstacle detection system includes an optical receiver, typically a photodetector, that receives a modulated light signal provided by a photo-emitter temporally controlled by a modulation signal. The photo-emitter illuminates the pinch zone during the two or more phases of a measurement period. The optical receiver receives illumination that is a combination of: 1) the reflection of a portion of the illumination provided by the photo-emitter from an intervening object within the pinch zone, if an object is present; 2) reflected light, if any, from the opposing side of the opening; and 3) illumination from ambient light such as sunlight illuminating the photodetector. If an object is present in the field of the emitted light beam, the amplitude of the signal reflected off the object varies based upon the size, orientation, and reflectivity/absorbency of the object. The obstacle detection system outputs a signal indicative of the detected variations in the optical receiver's output signal by comparing the receiver's output to a known threshold value to determine the absence or presence of an object within the pinch zone. The system's output signal may be an analog signal such as a voltage or an electrical current, a digital output signal, or an indication from a programmed controller.

One or more photo-detectors constitute the portion of the optical system that receives the illumination, extracts the reflected light signal and provides a detector output signal indicative of one or more characteristics of the received, reflected light. The detector output signal is processed to provide an indication of the presence or absence of an object within the pinch zone of the window control mechanism.

One embodiment of the obstacle detection system is illustrated in FIG. 1 wherein a modulator 110, or alternatively a micro-controller 122, which may have an internal timing system, provides a modulation signal 109 (119) to the photo-emitter driver 111. The photo-emitter driver 111 provides the power to the photo-emitter 102 that provides the modulated light signal 103. The photo-emitter 102 may be configured and arranged with an optical system to provide various patterns of illumination such as a plane of light, a multifaceted fan of light having a plurality of fingers, or a narrow beam of light.

An object 101, and/or a surface defining or proximate to the monitored space, reflects at least a portion of the incident light 103. Some portion of the reflected light is included in a light signal 105 that impinges upon a photodetector 104. The photo-detector 104 generates a detector output signal 107 that is indicative of at least one characteristic of the reflected light signal 105.

The detector output signal 107 is input to a preamplifier 106. Preamplifier 106 amplifies the detector output signal 107 and provides an amplified detector output signal 132 to a switching amplifier 108. The switching amplifier 108 synchronously detects the output signal 132. As used herein, synchronous detection utilizes a switching amplifier 108 having first and second inputs connected to the amplified detector output signal 132 and a reference voltage 125 from a reference supply 113, respectively. The switching amplifier 108 switches the gain applied to the inputs from the first gain to the second gain in synchronism with the illumination provided by the modulator 110 and associated modulated light source 102. The resulting signal 130 is averaged by integrating over a predetermined measurement period prior to comparison of the output 120 against a predetermined threshold value in detector 116. The predetermined threshold value is preset to trigger on the presence of an object in the opening.

A modulation signal 123 controls the timing of the switching amplifier 108 that switches the amplified detector output signal 132 and a reference voltage signal 125 between first and second gains. Alternatively, in an embodiment that utilizes the micro-controller 122 to modulate the illumination, the micro-controller 122 also provides a modulation signal 124 to the switching amplifier 108. The switching amplifier 108 provides an output 134 that is the difference between the two inputs multiplied by a corresponding gain.

The first and second gains, the duration of the active and inactive phases of the illumination source, and the number of active and inactive phases within a measurement period are selected to reduce the level of background interference from ambient light sources under normal conditions. The values of these variables are selected such that, in the absence of a modulated light signal and extraordinary ambient light, an average or integrated value of the switching amplifier output will not change from its initial value over a measurement period. Thus, any signals that are not synchronous with the modulated light signal, i.e., signals that are present during both the active and inactive phases of a measurement period, will be averaged or integrated to zero over the measurement period. Averaging or integrating the switched amplifier output removes the non-synchronous background signals from the processing path so they will not interfere with the detection of obstacles within the pinch zone.

However, sunlight may make the total photocurrent output several orders of magnitude greater than the modulated portion of the photocurrent, preventing obstacle detection. This change in magnitude may have a significant impact on the photodetection system, thus distorting the response. The remainder of the block diagram of FIG. 1 will be described before corrective measures for excess sunlight are discussed.

In order to compensate for modulated radiation reflected from the monitored volume in the absence of an obstacle, an adjustable predetermined offset voltage 112 can be arithmetically combined with the synchronously detected signal 134 to compensate for the difference between the output of the preamplifier 106 and the reference voltage 113, providing a substantially zero average value into the integrator 114 when no obstacle is within the pinch zone. The adjustable offset voltage 112 may be determined during a calibration or initialization process prior to use or it may be determined on a periodic or as-needed basis.

The integrator 114 receives the difference 130 between the synchronously detected signal 134 and the adjustable offset voltage 112. The integrator 114 integrates this difference signal 130 over the measurement period and provides an integrated signal to the detector 116. The output of the integrator is evaluated by detector 116 by comparing the integrated signal to a predetermined threshold, and generating indicia of the absence or presence of an object within the pinch zone.

Figure 2A:
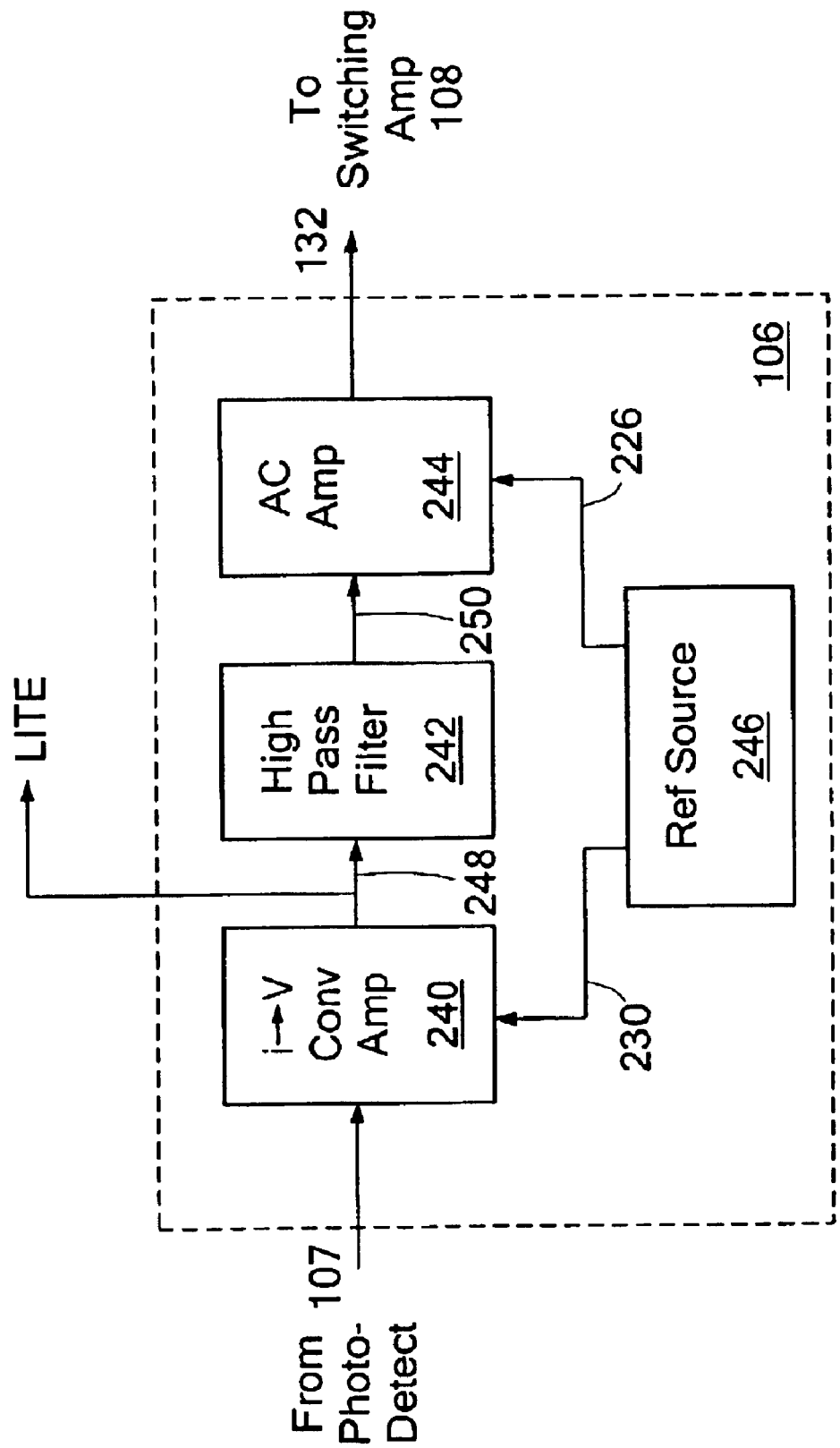
FIG. 2A is a schematic diagram of the input amplifier of FIG. 1.

FIG. 2A is a block diagram of one embodiment of a preamplifier 106 for the optical sensor system of FIG. 1. A current 107 from the photo-detector (not shown) is an input to an amplifier 240 that converts the current to a voltage. The output 248 of amplifier 240 passes through a high pass filter 242 that removes much of the DC component from the signal. The output 250 of the high pass filter 242 is an input to AC amplifier 244. The output 132 of AC amplifier 244 enters the switching amplifier (not shown). A reference voltage source 246 is provided to both amplifiers 240, 244 when the amplifiers are single supply operational amplifiers.

Figure 2B:
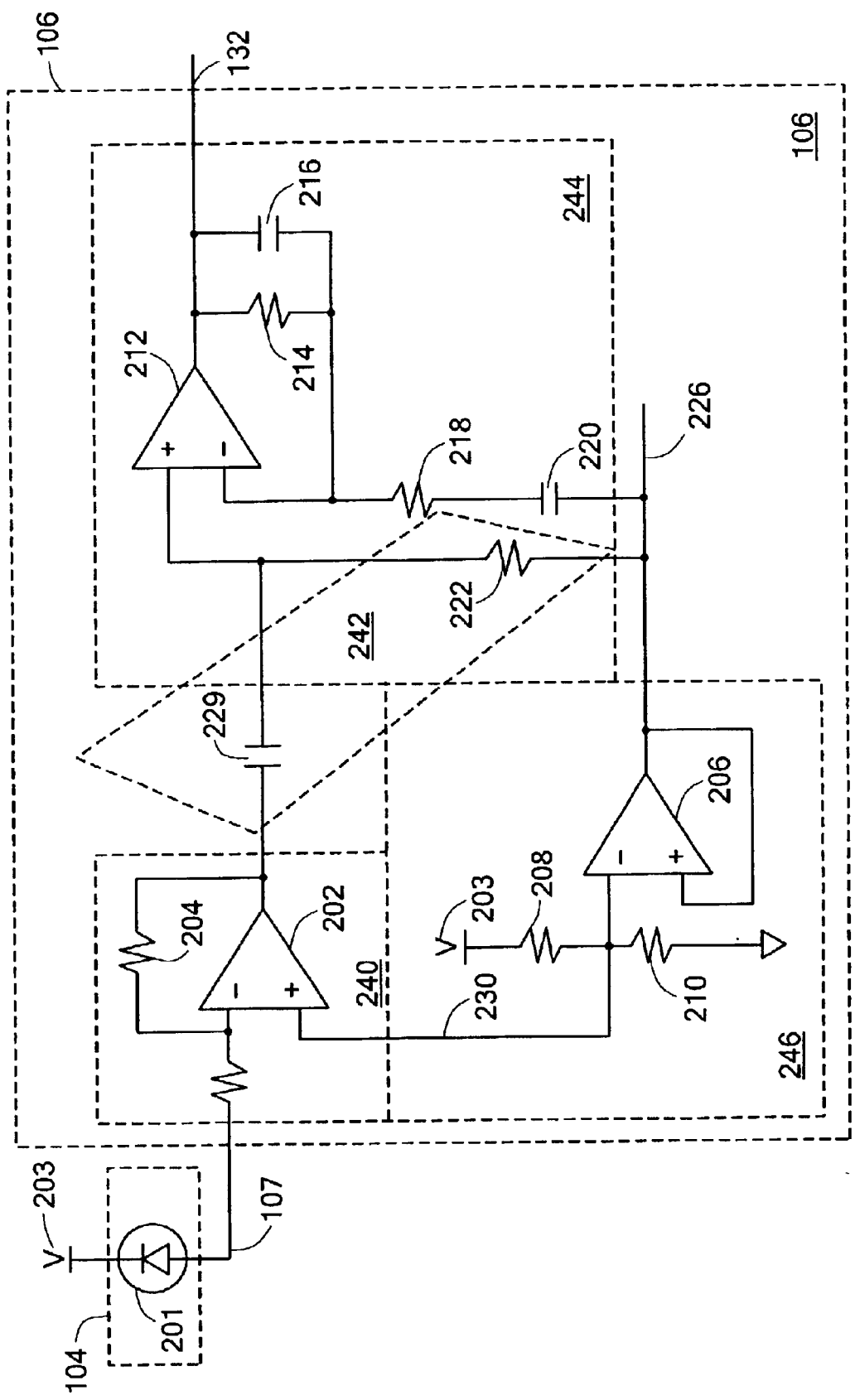
FIG. 2B is a circuit diagram of a photo-detector and input amplifier of FIG. 2A.

FIG. 2B illustrates one embodiment of the circuits for the block diagram of FIG. 2A. Photo-detector 104 may be a photodiode 201 producing a photocurrent 107 that is a function of the intensity of the incident light. A suitable photodiode will typically be a PIN photodiode that has a sufficiently fast response time to allow satisfactory operation at the desired modulation frequency. In addition, the PIN photodiode may be operated in a reverse bias mode as shown in FIG. 2B in order to increase the width of the depletion region, thus providing a greater bandwidth of operation.

Op-amp 202 and resistor 204 form a current-to-voltage converter 240 which converts the photocurrent 107 produced by photodiode 201 into a voltage. In a preferred embodiment, resistor 204 is 10 k ohm resistor. Op-amp 202 preferably has an input bias current that is substantially less than the signal current received from photodiode 201, and in addition, should have a slew rate of at least 3–4 volts/microsec in order to operate at modulation frequencies above 10 kHz. In the illustrated embodiment, the op-amp 202 is a single supply op-amp, and therefore a non-zero voltage reference rail 230 must be provided about which the signal will swing. This reference rail is set by the reference source 246 which is a combination of op-amp 206, resistors 208 and 210, and supply voltage (V) 203. The voltage divider sets the reference rail based on the pair of resistors 208 and 210. In a preferred embodiment, resistors 208 and 210 are of equal value and the reference rail 230 is therefore set at V/2 volts. Op-amp 206 is configured as a unity gain amplifier and provides a low impedance reference voltage rail 226 to AC amplifier 244 and other parts of the system.

The output signal from the op-amp 202 is AC coupled, via capacitor 229, to the AC amplifier 244 to block low frequency and DC signals arising from ambient illumination, particularly sunlight. Capacitor 229 and resistor 222 form a single-pole high pass filter with a cutoff frequency of a few hundred Hertz. The AC coupled signal is input to an AC amplifier 244 comprised of: op-amp 212; resistors 214, and 218; and capacitors 216 and 220. AC amplifier 244 provides an amplified signal on line 132. The preferred type for op-amps 202, 206 and 212 for single supply operation are rail-to-rail input and output op-amps, having low offset voltage and low noise. In a preferred embodiment, resistor 214 is 100 k$\Omega$, capacitor 216 is 3 pf, resistor 218 is 5.1 k$\Omega$, capacitor 220 is 0.01 $\mu$f, and capacitor 229 is 22 $\mu$f. Op-amp 212 is a MAX4126, op-amp 206 is a TLC082 and op-amp 202 is a TLC082.

As a first way to limit the effect of sunlight on the detector, the photodetector 104, such as photodiode 201, is chosen to be operable in the infrared wavelengths and have visible light blocking filters incorporated into the lens material for wavelengths associated with sunlight. These filters will have a predetermined effectiveness, but may not completely eliminate the effect of sunlight.

In addition, the sensor device (in the case of a monitored area with a moving panel) can utilize the moving panel itself to offset the sunlight's impact on the performance of the system. In one application, the IR device can utilize a window or material on the window such as a film, to help shade the IR sensor and provide continued monitoring to detect obstacles during the remaining closing operation of the system. The area near the closure point is generally the most critical area for obstacle detection.

In addition, the DC characteristics of the sunlight induced photocurrent allows this portion of the signal to be removed using an AC filter 242 as shown in FIG. 2A. Because the potential magnitude of the sunlight induced signal is so great, any DC gain in the initial amplifier stage creates the possibility for saturation and limits the dynamic range of the detection system.

When the ways of limiting the effect of sunlight are insufficient, a first compensation system according to the invention may be added to the detection system. This first compensation system takes advantage of the fact that the sunlight-induced signal is a DC component of the photo-detector output. The magnitude of the sunlight-induced signal is first measured at the output 248 of the initial gain stage 240, or a similarly connected DC amplifier, as a DC voltage. This DC voltage is used as an input value to a control element that compensates for the adverse sunlight effects by, for instance, changing the gain of the initial gain stage 240 or injecting a compensating current into the input of the initial gain stage 240.

Figure 3A:
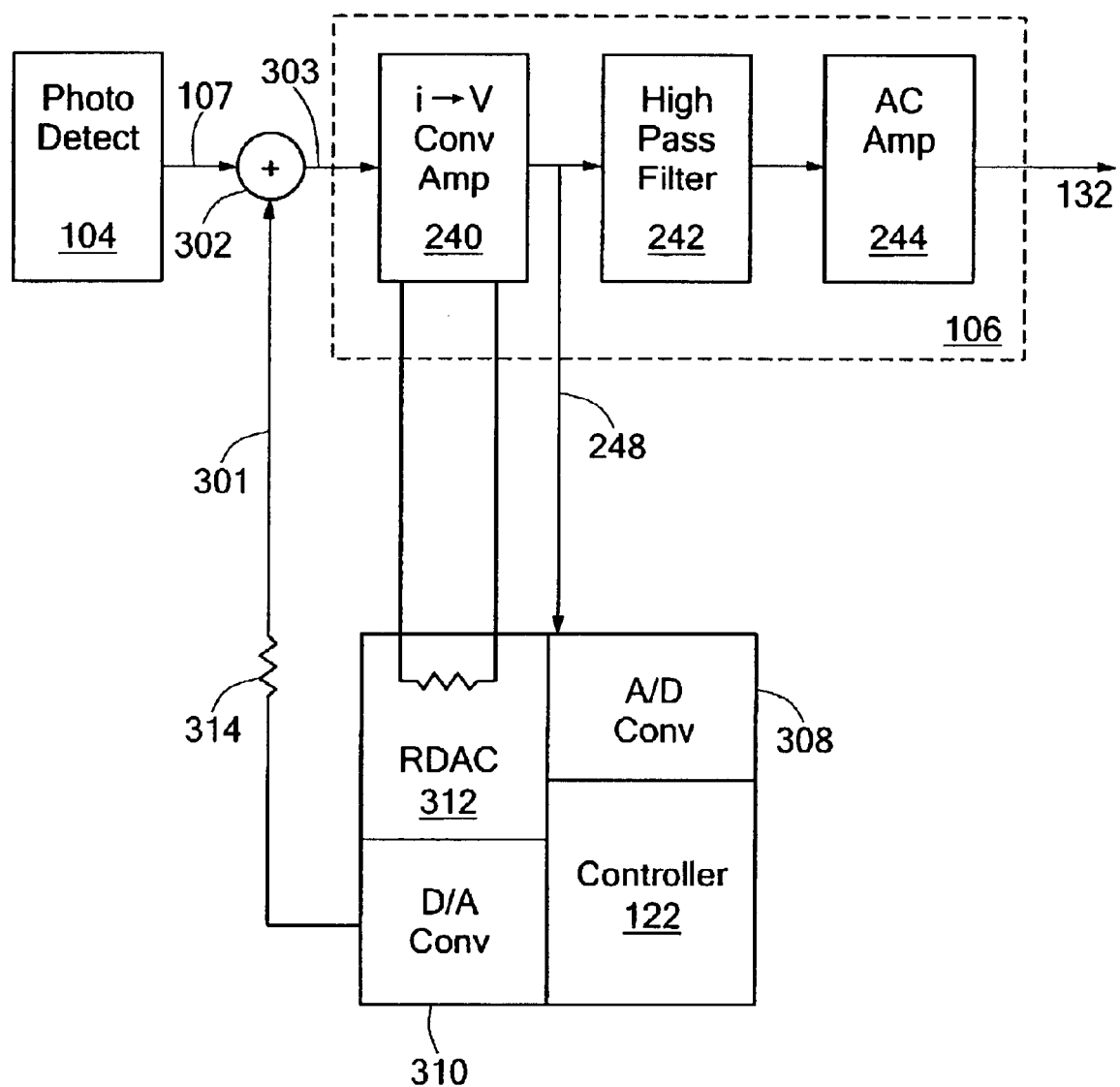
FIG. 3A is a block diagram of the front end of the system of FIG. 1 with one embodiment of the presently disclosed invention incorporated.

FIG. 3A illustrates an embodiment of a modification to the front end of block diagram of FIG. 2A to implement the first compensation system according to the invention. This modification uses a controller 122 to measure the DC component of the initial gain stage output 248 and use that value to determine whether a gain change is needed and to determine the value of the compensating current.

The gain of the initial gain stage 240 is changed by modifying the value of a resister in the gain circuit 240. A digital-to-resistance converter 312 allows the variable resistance to be controlled by a controller 122 that uses an algorithm based the output of the A/D converter 308 that receives the DC output 248. The changed gain brings the initial gain stage back into predictable operation.

The compensating current to be added to the photodetector output 107 is equal in magnitude but opposite in sign to the DC component of the photodetector output current 107. The sum of these currents creates a DC null condition on input 303, a zero DC voltage output as referred to the common rail of the amplifier, that is then maintained by the control element 122. If the sunlight is strong enough, the photocurrent generated may saturate the initial gain stage 240 of the sensor rendering it inoperable. Then the gain change must first negate the saturation effects before the compensating current can be developed.

After the preamplifier input 303 has been converted from current to a voltage by the converter amplifier 240, the output 248 is connected to an input of an analog-to-digital (A/D) converter 308 that can be integrated with the controller 122. The A/D converter 308 converts the voltage output 248 into a digital value that can be read by the controller. The controller 122 uses the digital representation of the voltage 248 to determine the output current 301 to be sent to the summing junction 302. This output current may be produced by a D/A converter 304 connected to the controller 122. The output current 301 is selected to cancel out the ambient light component of the photo-detector output so that the remainder of the system can perform within the known parameters. This condition is achieved when the DC voltage as measured on line 248 is reduced to the common rail value due to of the injection of the canceling current 301 at summing junction 302. When the ambient light is similar to the illumination used during calibration, the output current into the summing junction 302 will be negligible. As the sunlight increases, the current supplied on line 301 increases to cancel the sunlight-induced current from the photo-detector 104.

Figure 3B:
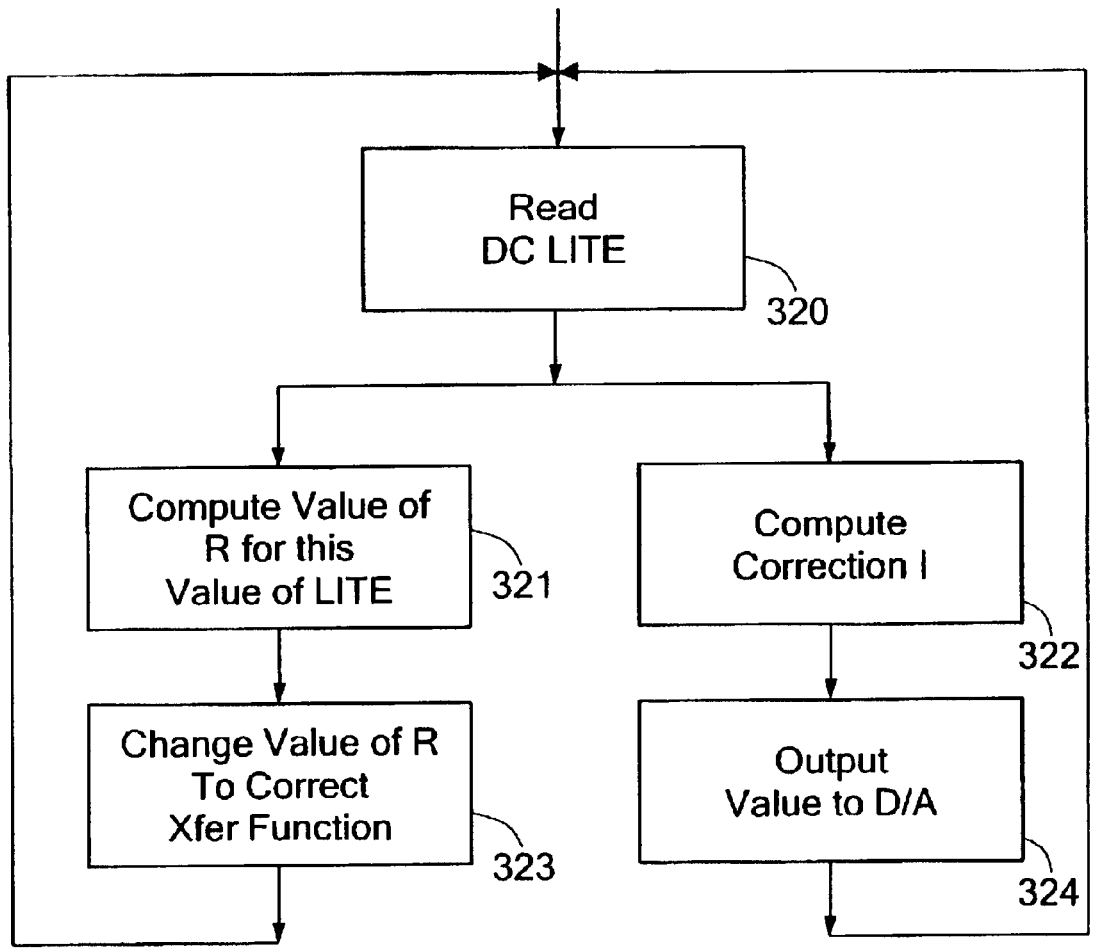
FIG. 3B is a flow chart of the logic employed in the controller of FIG. 3A.

FIG. 3B illustrates a flow chart of the logic that could be used within the controller 122 to determine the compensation values. The controller 122 reads the value of the voltage output 248 from the converter amplifier 240, termed LITE, at step 320. It uses this value in two ways: to correct the preamplifier transfer function and to compute a correction value. At step 321, the value of LITE is used to compute the correct value of R for the gain circuit in the input stage 240. The value of the variable resistor in the RDAC 312 is changed to this value, at step 323. Simultaneously, the value of LITE is also used as a variable in the computation algorithm that determines the correction value at step 322. At step 324, the correction value is used to generate a current 301 into the summing junction 302. The controller continually loops through this routine to track changes in sunlight and keep the transfer function in the proper range.

Figure 3C:
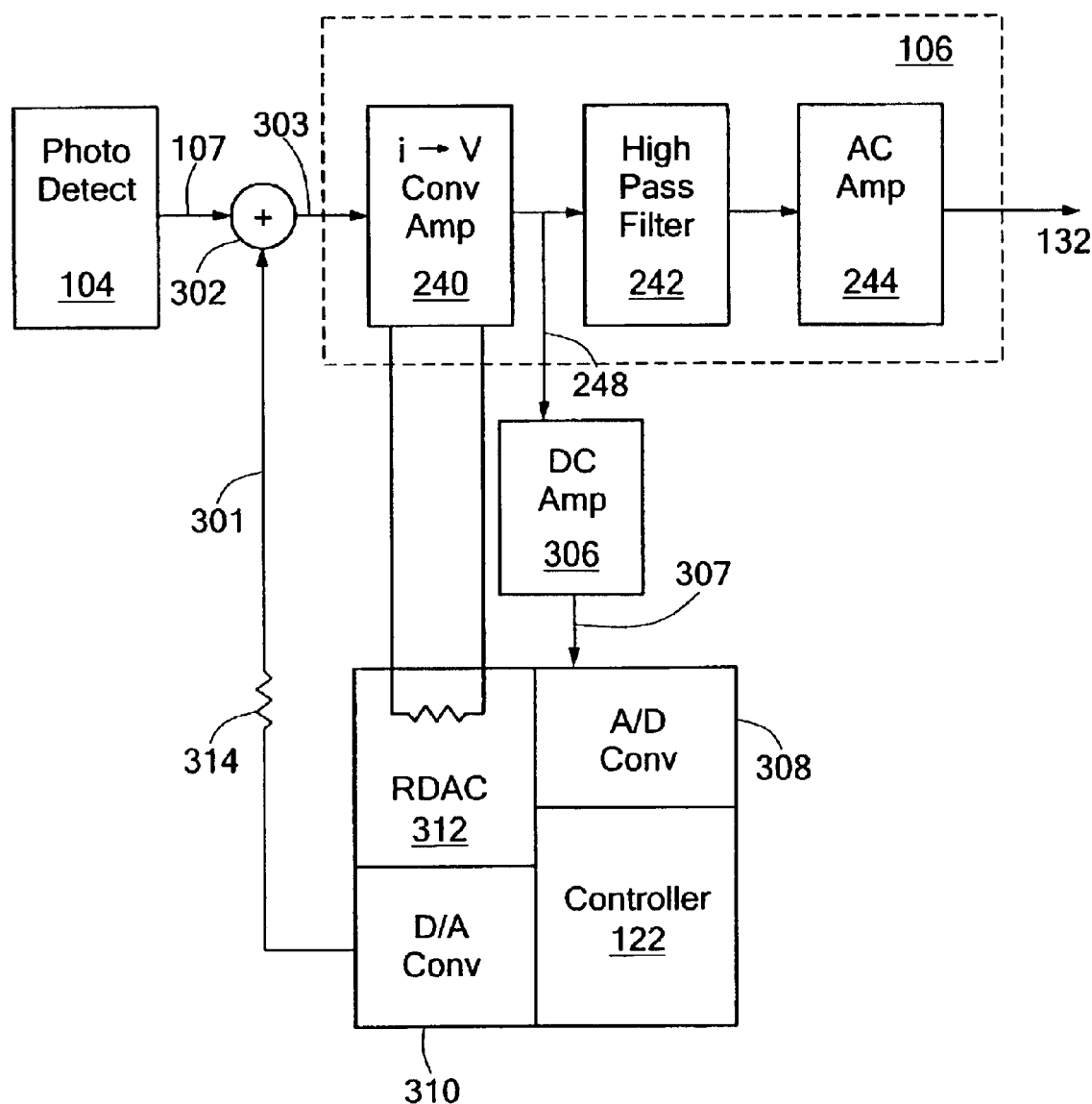
FIG. 3C is a block diagram of the front end of the system of FIG. 1 with another embodiment of the presently disclosed invention incorporated.

A refinement on the embodiment of the first compensation system of FIG. 3A is shown in FIG. 3C. Here, a DC amplifier 306 is interposed between the converter amplifier 240 and the A/D converter 308. The DC amplifier 306 isolates the converter amplifier 240 from the load of the A/D converter 308 and can be biased to output a negligible value when the amount of ambient light is inconsequential while providing maximum sensitivity. The operation of the program in the controller follows the flow chart as detailed in FIG. 3B.

Figure 4A:
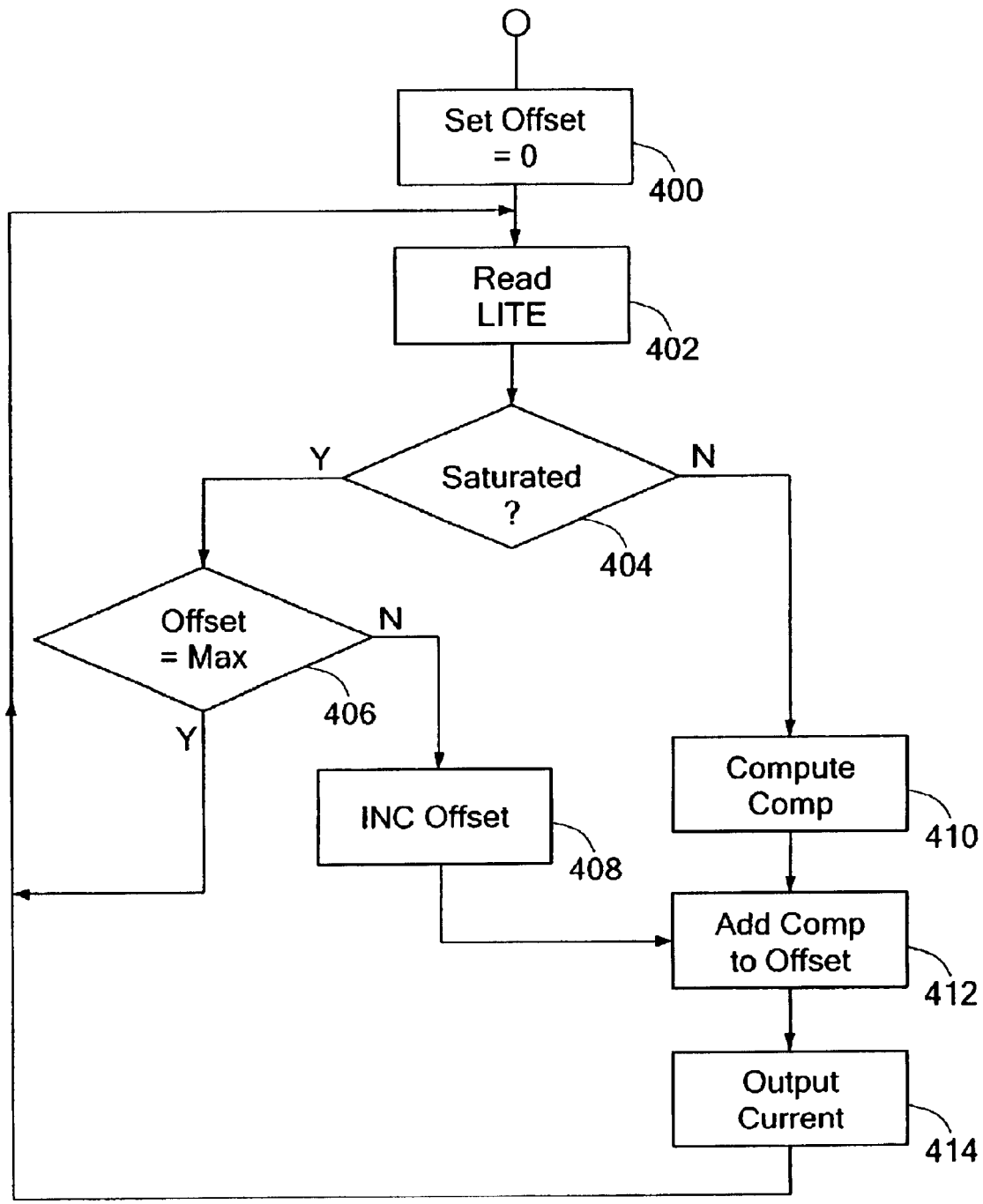
FIG. 4A is an alternate flow chart of logic to be employed in the controller of FIGS. 3A and 3C.

FIG. 4A illustrates an alternate control sequence that accommodates the possibility of saturation of the preamplifier 240. This control method uses a variable, OFFSET, that adds large increments of compensation current until the value representing the DC component of the photodetector signal, LITE (248), is less than a saturated value. The sequence starts by setting OFFSET to zero at step 400. The value of LITE is read at step 402 as in the previous control loop. The value is tested at step 404 to determine if the amplifier 240 was saturated. If the value indicates no saturation, the correction value is calculated at step 410. This value is added to the current value of OFFSET at step 412, determined as described below, to determine the current 301 to be output at step 414.

If the value of LITE indicates saturation, OFFSET is tested against a maximum value at step 406. If OFFSET is not already at a maximum value, OFFSET is incremented by a predetermined amount at step 408. The resultant value is the current value of OFFSET used in step 412 to determine the value of the current 301 output at step 414 to the summing junction 302. The controller returns to sample the value of LITE again at step 402 to refine the value of the output current 301. When each increment of OFFSET is greater than the value that can be added by normal compensation, the preloading provided by the OFFSET values allows the effect of the sunlight to be cancelled out.

If OFFSET is at the maximum, and the value of LITE is saturated, the maximum compensation is being supplied and there is no compensation that will bring the value below saturation. Therefore, the controller returns to step 402 to monitor the value of LITE until the value received is less than a saturated value.

Figure 4B:
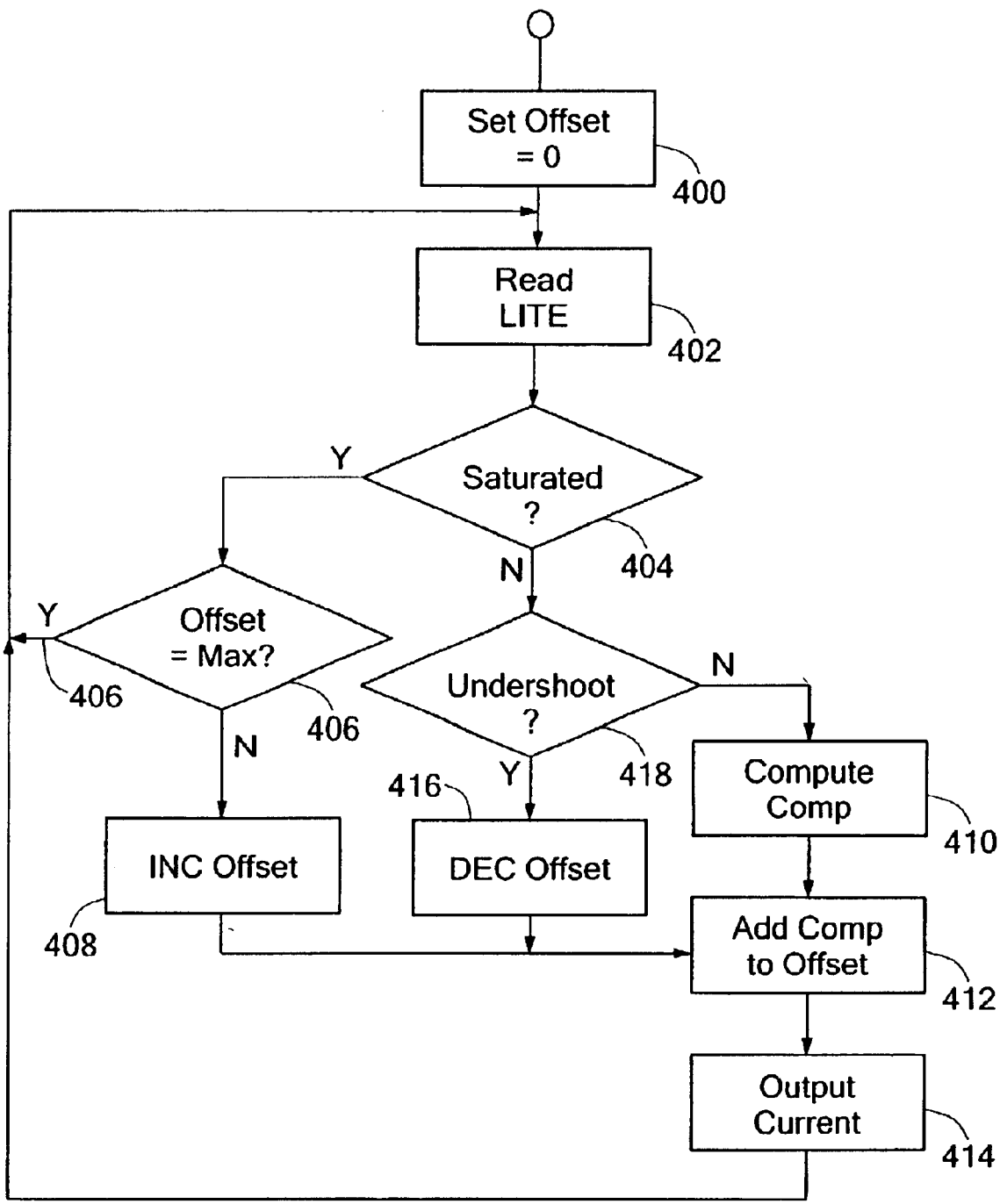
FIG. 4B is yet another flow chart of logic to be employed in the controller of FIGS. 3A and 3C.

FIG. 4B illustrates adding an arm to the flow chart that reduces OFFSET at step 416 when the value received indicates an undershoot at step 418, implying that OFFSET is too large. This allows the system to track the changes occurring as a car transitions from excess sunlight to shade.

Figure 5A:
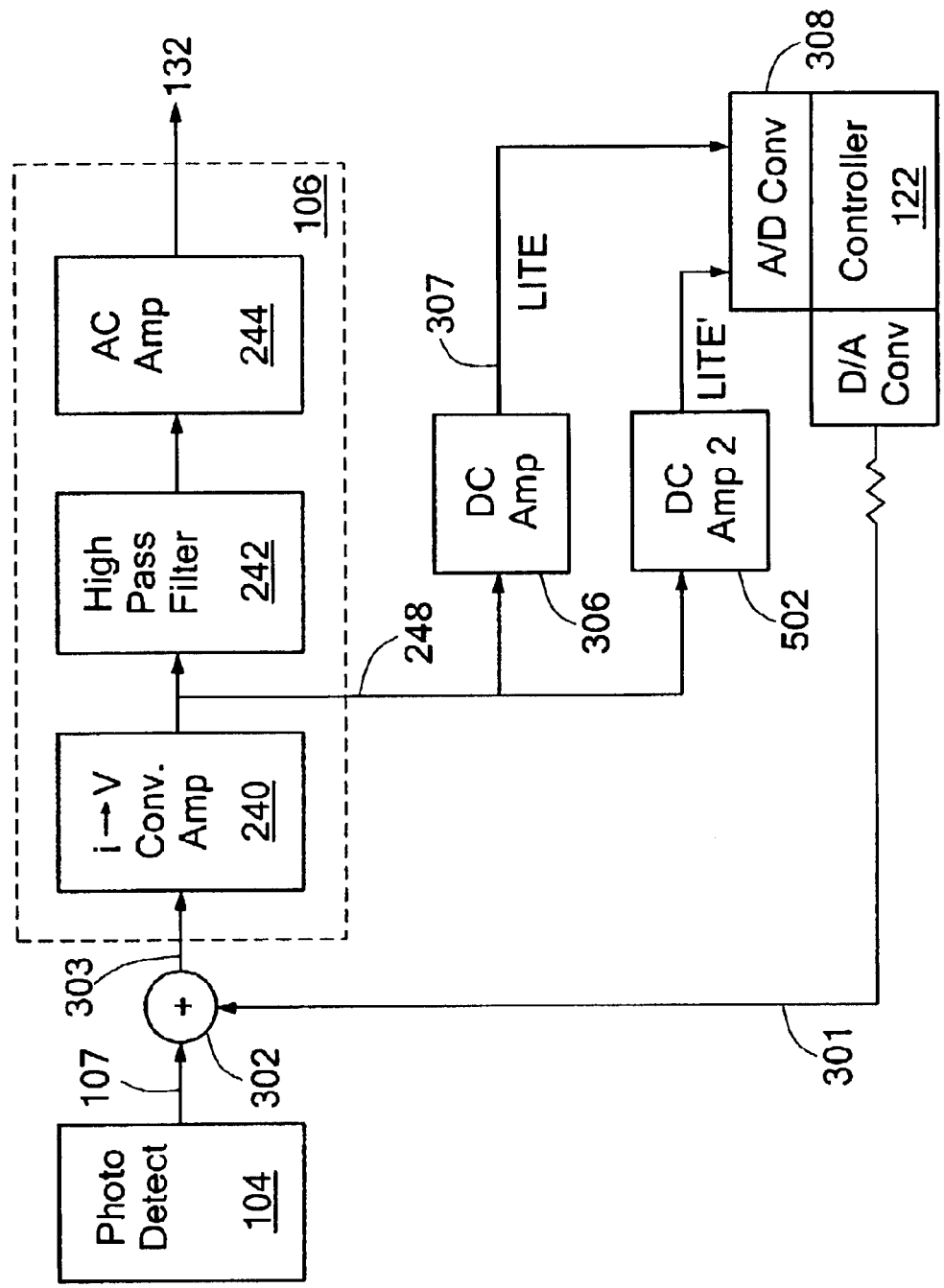
FIG. 5A is a block diagram of the front end of the system of FIG. 1 with yet another embodiment of the invention incorporated.

A further refinement on the embodiment of the first compensation system of FIG. 3C is shown in FIG. 5A. The summed signal 303, comprising the photodetector output 107 and the controller-generated compensating current 301, is still fed to the current converter 240. However, a pair of DC amplifiers is driven by the DC output 248. DC amplifier-DCAMP2 502 has sufficiently low gain that it will not saturate under any practical conditions of sunlight illumination. Therefore, the output of DC amplifier-DCAMP2, LITE', will usually have a value that can be interpreted after conversion into a digital value by the A/D converter 308. This value of LITE' is used to set an offset value for the current 301 to be added to the value dictated by the higher-gain DC amplifier 306. With the value of OFFSET calculated from both LITE and LITE', the system tracks the changes in sunlight with greater responsiveness.

Figure 5B:
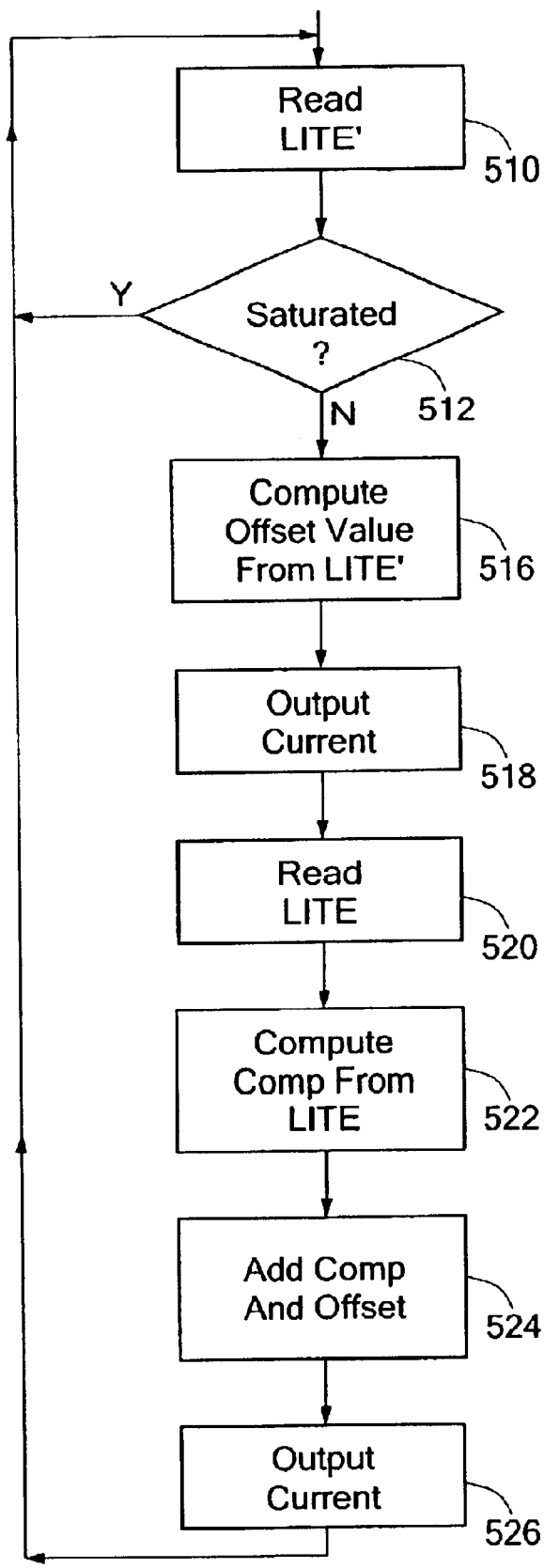
FIG. 5B is a flow chart of logic to be employed in the controller of FIG. 5A.

FIG. 5B is the flow chart for the controller 122 utilizing the elements in the block diagram of FIG. 5A. The controller 122 reads the value of LITE' at step 510 from the A/D converter 308 connected to the low-gain amplifier-DCAMP2 502. This value is tested against a saturation level at step 512. If the value is greater than a saturation level, there is no compensation that can be added to make the system usable, so the system remains in a loop, and tests again at step 510. If the LITE' value is less than saturation, the value of LITE' is used to calculate the offset value according to a predefined algorithm at step 516. The offset value is converted into a current 301 that is provided to the summing junction 302 at step 518.

The value for LITE is read at step 520 from A/D converter 308. The value of LITE is used to calculate a compensation value according to a separate predefined algorithm at step 522. This compensation value is added to the offset value at step 524 before being used to output an updated current 301 at step 526 to the summing junction 302. The system then reads the value of LITE' and starts the process again at step 510. The active cancellation of the sunlight-induced signals permits the initial amplifier to be operated at higher gain than is possible when saturation is a factor. As one skilled in the art will realize, this will permit the initial amplifier to have a higher gain permitting overall gain requirement for the modulated signal to be implemented in fewer stages and with improved signal to noise characteristics. This system has the advantage that using the low gain preamplifier to control the offset currents lets the system track both increases and decreases in sunlight.

Figure 6:
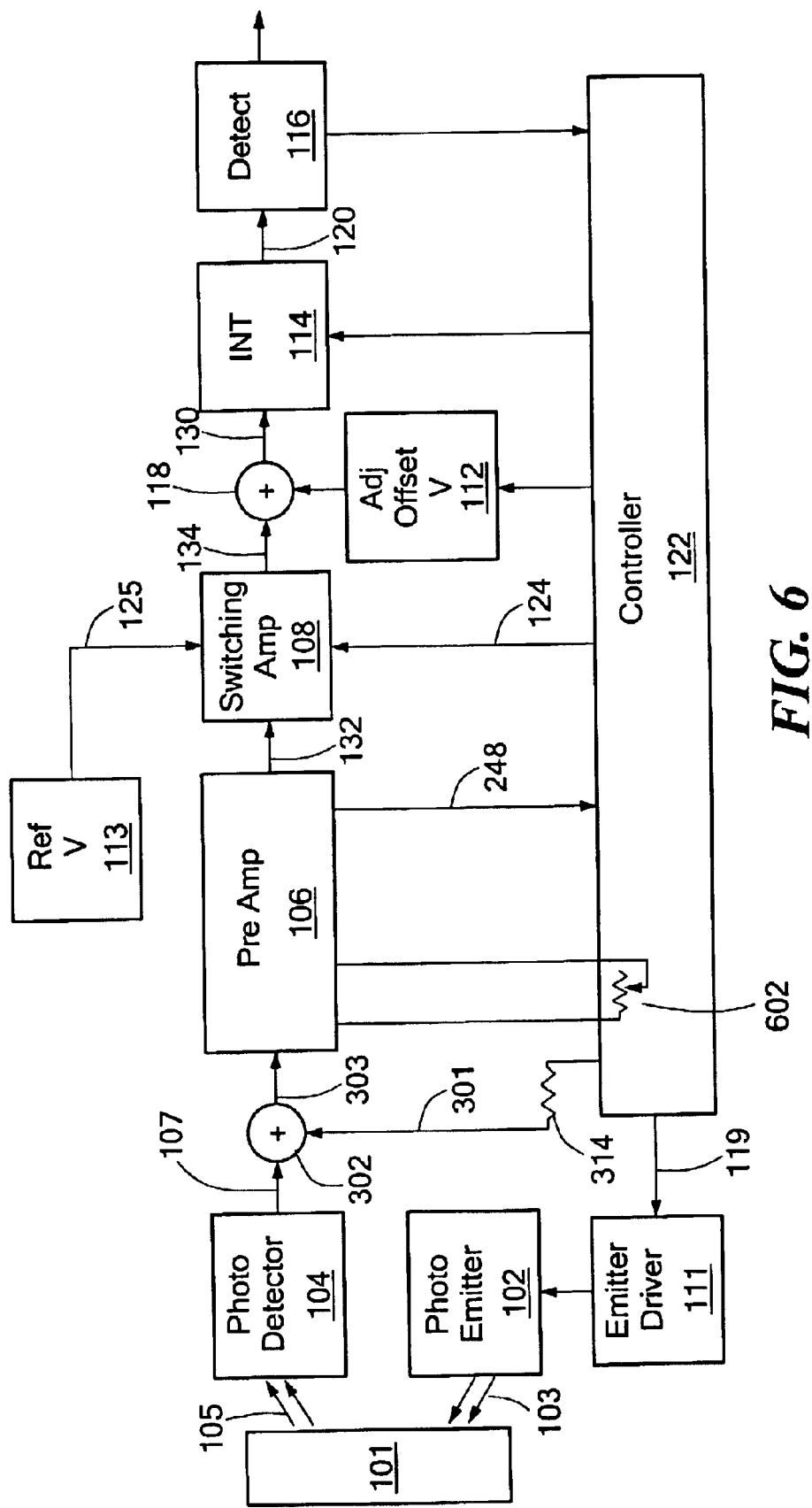
FIG. 6 is a block diagram of an optical sensing system incorporating the embodiment shown in FIG. 5A.

Utilizing the above techniques to mitigate the effect of sunlight on the infrared obstacle detection yields a block diagram of the system with the controller 122 providing the modulation as shown in FIG. 6. The primary difference is in the DC voltage output 248 from the preamplifier 106 to the controller 122. This level is used to set the value of the gain resistor 602, and to set the value of the current 301 added to the photocurrent 107 to compensate for the sunlight induced component.

Figure 7A:
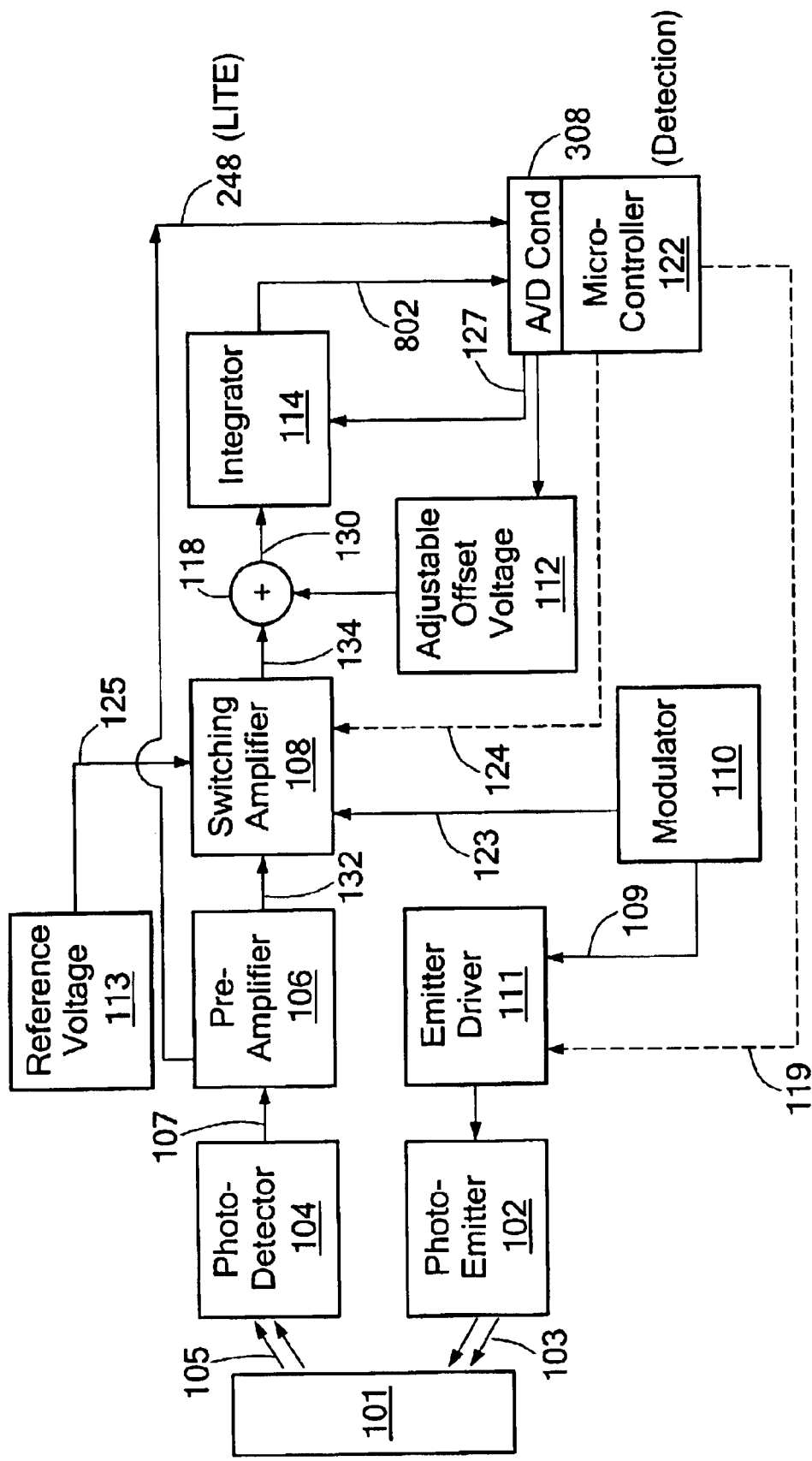
FIG. 7A is a block diagram of a digital implementation of the optical sensing system of FIG. 1.

FIG. 7A illustrates a block diagram of a modification to the obstacle detection system of FIG. 1 to accomplish compensation primarily in software. This compensation system uses a real-time operating system to implement a control function that continually monitors the DC component of the incoming signal 248 (LITE) and removes the effect of the sunlight from the value of the integrator output 802. This allows objects to be detected regardless of sunlight presence.

Figure 7B:
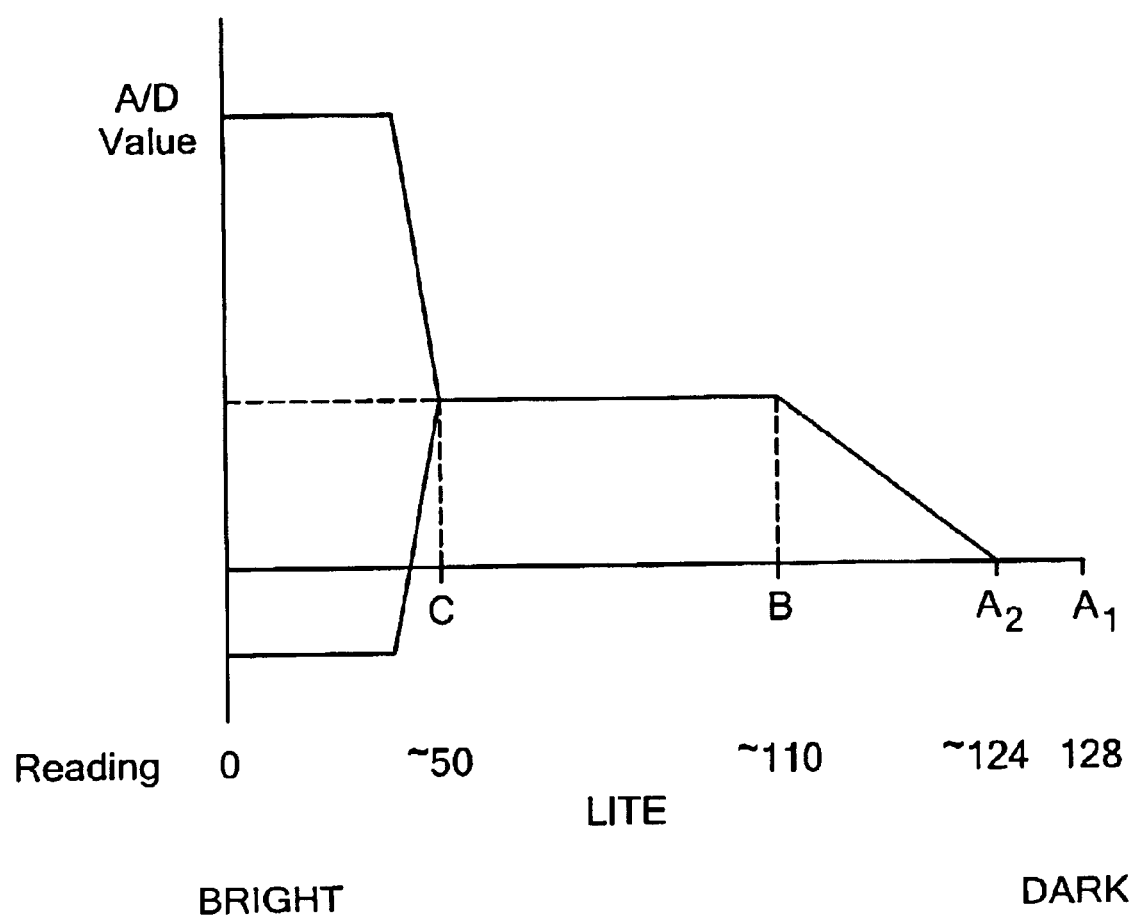
FIG. 7B is a diagram of the relationship between ambient light brightness and the effect on detection readings for the embodiment of FIG. 7A.

This compensation method depends on knowing the relationship between the actual ambient light brightness (LITE) and the value of the A/D converter 308 output representing the value of the integrator output 802. An illustrative relationship between ambient light brightness (LITE) and the output 802 of the integrator 114 is shown in FIG. 7B where brightness is maximal on the left where LITE equals zero. FIG. 7B illustrates that when no ambient light is received, the area between points $A_1$ and $A_2$, the A/D reading of the integrator output 802 is negligible. When the light is between the values of $A_2$ and B, there is a linear relationship between the LITE reading and the A/D output. When light values are between B and C, the A/D output is constant. For light values exceeding C, the system cannot be compensated. A graph such as that of FIG. 7B is the basis for a compensation algorithm.

Figure 7C:
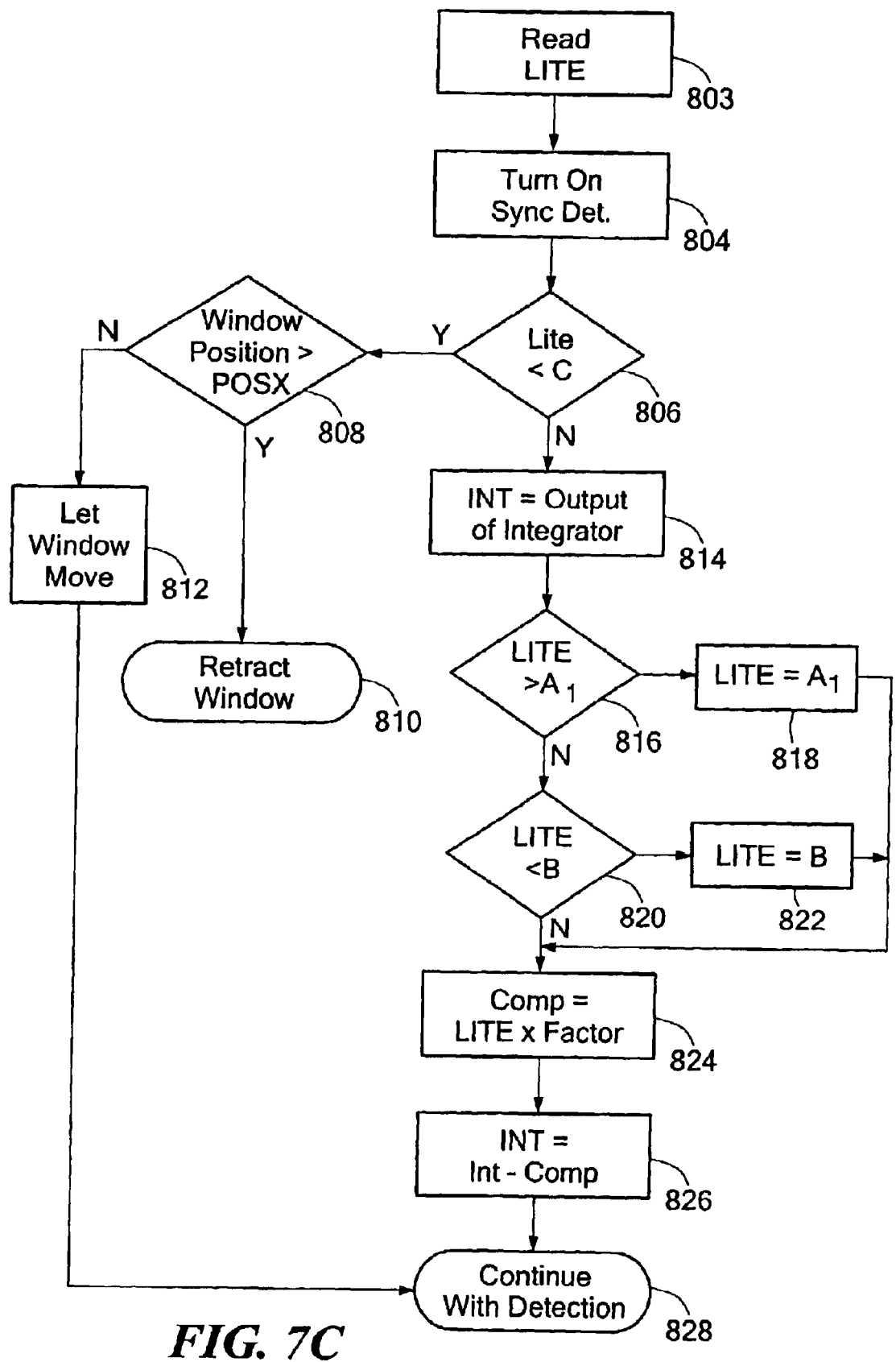
FIG. 7C is a flow chart of logic to be employed in the controller of FIG. 7A.

FIG. 7C illustrates a flow chart using this information. At step 803, the DC ambient light intensity (LITE) is read. The synchronous integrator 114 is then turned on at step 804 and the modulator 110 or controller 122 starts supplying the emitter driver 111 with modulated signals so that modulated light signals 103 are being transmitted by the photo-emitter 102. The value of LITE is checked against the maximum usable brightness limit (C) at step 806 and if LITE is brighter, the position of the moving member is checked at step 808 for safety reasons. Along the path of a moving member, such as a power window, there is a point, POSX, beyond which the consequence of pinching is so dire, that it is better that the express close function fail than that it proceed without the safeguards enabled by the presently disclosed system. Therefore, if the light is too bright and the window is beyond the critical point, POSX, the window is retracted in step 810. If the window has not reached the critical point, the window is allowed to continue moving in step 812. Further functions performed in conjunction with the window movement will be performed in step 828. For example, certain systems also employ sensors that detect when a moving member comes into contact with an obstacle during this part of the system operation. Eventually, the program will return to step 803, recheck the ambient light and continue monitoring the express close operation.

If blinding light is not present, the value 802 being generated by the integrator 114 is read in step 814. The value for LITE is tested in step 816 to determine if it is beyond the dark level and therefore likely caused by noise. In step 818, any aberrant value detected above is set to the lowest recognizable light level A1. The value of LITE is tested in step 820 to determine if it is beyond the linear range, but still usable (between points B and C). If so, step 822 sets the LITE to B. If the value of LITE is within the linear range, it is not reset. In step 824 the compensation factor is calculated as LITE times a slope factor selected based on the data in FIG. 7B. The compensated value of the integrator output 802 is determined in step 826 by subtracting the compensation factor (COMP) from the reading 802 (INT) from the integrator 114. In step 828, the rest of the detection system uses the compensated integrator output value to determine whether an obstacle is present in the aperture as previously described.

Those of ordinary skill in the art will appreciate that variations to and modification of the above-described methods and apparatus for providing sunlight compensation working with object detection in an aperture in the path of a closure member may be made without departing from the inventive concepts disclosed herein. Accordingly, the invention should be viewed as limited solely by the scope and spirit of the appended claims.

What is claimed is:

1. An optical object sensing apparatus having ambient light cancellation capabilities comprising:

an optical source and optical detector optically coupled for monitoring a target area that reflects at least a portion of an optical signal for detection as a received optical signal, said optical signal having temporal characteristics allowing said optical signal to be distinguished from ambient light, said optical detector providing a detector output signal indicative of the characteristics of said received optical signal;

a conditioning circuit for outputting a conditioned output indicative of one characteristic of said detector output signal and a level output indicative of a second characteristic of said detector output signal;

a sensing apparatus for using said conditioned output to sense the presence of an object in said target area; and a controller for receiving said level output from said conditioning circuit, converting said level output to a digital output, determining the magnitude of an ambient light-induced signal in said digital level output and outputting a control signal to a second input of said conditioning circuit, wherein said control signal is used by said conditioning circuit as an error compensating offset.

2. The apparatus of claim 1 wherein said conditioning circuit comprises:

a summing junction having a plurality of inputs and a summed output, a first input of said summing junction being connected to said optical detector for receiving said detector output signal, and a second input of said summing junction being connected to said control signal;

a preamplifier connected to said summed output for receiving a summed signal and for providing said level output;

and further wherein said controller includes:

an analog-to-digital converter for receiving said level output and for outputting a digital output; and a digital-to-analog converter for receiving a digital control signal from said controller and outputting an analog signal as said control signal to said second input of said summing junction.

3. The apparatus of claim 2 further comprising a digital-to-resistance converter having a variable resistance that is set based on an algorithm using said digital output, said variable resistance connected into a gain circuit of said preamplifier for controlling the transfer function of said preamplifier.

4. The apparatus of claim 2 further comprising an amplifier for receiving said level output and for amplifying said level output prior to it being received by said analog-to-digital converter, wherein said amplified level output is proportional to said summed signal.

5. The apparatus of claim 4 wherein said conditioned output is AC connected to the remainder of said optical object sensing apparatus and said level output is DC connected to said amplifier.

6. The apparatus of claim 4 further comprising:

a low-gain amplifier for receiving said summed output in parallel with said amplifier and for providing a reduced range output proportional to said summed output; and a second analog-to-digital converter for receiving said reduced range output and for outputting a second digital output to said controller, wherein said controller outputs said control signal based on said digital output and said, second digital output.

7. The apparatus of claim 6 wherein said controller is adapted to execute an algorithm comprising the following steps:

(a) initialize OFFSET and COMP parameters;

(b) read said second digital output;

(c) compare the value of said second digital output against a saturation value;

(d) if the value of said second digital output exceeds said saturation value proceed to step (a);

(e) else, compute a value for OFFSET using said value of said second digital output in an offset algorithm;

(f) add said values of OFFSET and COMP and output said control signal based on said added values;

(g) read said digital output;

(h) compute a value for COMP using said value of said digital output in a camp algorithm;

(i) add said values of OFFSET and COMP and output said control signal based on said added values; and (j) proceed to step (b).

8. The apparatus of claim 7 wherein a digital-to-resistance converter is utilized to change said gain.

9. The apparatus of claim 2 wherein said controller is adapted to determine whether said level output exceeds a predetermined limit and adjusts a gain of said preamplifier if said predetermined limit is exceeded.

10. The apparatus of claim 1 wherein said optical signal is an infrared optical signal.

11. The apparatus of claim 10 further comprising a filtering agent disposed on said optical detector, said filtering agent for screening non-infrared energy.

12. The apparatus of claim 10 wherein said optical object sensing apparatus is operative in conjunction with a power window and wherein said window partially covering said target area filters said non-infrared component of said optical signal received by said optical detector.

13. The apparatus of claim 1 wherein said controller is selected from the group consisting of a microcontroller, a microprocessor and a programmable logic device.

14. The apparatus of claim 1 wherein said controller is adapted to execute an algorithm comprised of the following steps;

(a) reset parameters OFFSET and COMP;

(b) receive said digital output;

(c) test the value of said digital output against & saturation value;

(d) if said digital value is less than said saturation value, proceed to step (g);

(e) else, test said OFFSET parameter value against a maximum sand if said OFFSET parameter value is equal to said maximum, go to step (b), otherwise increment said OFFSET parameter value;

(f) add said OFFSET parameter value to said COMP parameter value, output a control signal based on the result, and proceed two step (b);

(g) use said value of said digital output in an algorithm to compute a new COMP parameter value; and (h) proceed to step (f).

15. The apparatus of claim 1 wherein said controller is adapted to execute an algorithm comprised of the following steps;

(a) reset parameters OFFSET and COMP;

(b) receive said digital output;

(c) test the value of said digital output against a saturation value;

(d) if said: digital output value is less than said saturation value, proceed to step (g);

(e) test said OFFSET parameter value against a maximum and if said OFFSET parameter value is equal to said maximum, proceed to step (b), otherwise increment said OFFSET parameter value;

(f) add said OFFSET parameter value to said COMP parameter value, output a control signal based on the result and proceed to step (b);

(g) test said digital output value against an undershoot value;

(h) if said, digital output value is less than said undershoot value, decrement said OFFSET parameter value and proceed to step (f);

(i) else, use said digital output value in an algorithm to compute a new value for said COMP parameter; and (h) proceed to step (f).

16. An optical object sensing apparatus capable of compensating for the effect of ambient light, comprising:

an optical source and detector optically coupled for monitoring a target area that reflects at least a portion of an optical signal for detection as received optical signal, said optical detector providing a detector output signal indicative of one characteristic of said received optical signal;

a conditioning circuit for outputting a first digital output representative of said detector output signal and a second digital output representative of an integrated output signal; and a controller for receiving said first and second digital outputs, said controller adapted to determine an effect of said ambient light on said integrated output signal from said first and second digital outputs and adapted to output a detection output.

17. The apparatus of claim 16, wherein said conditioning circuit comprises:

a preamplifier for receiving said detector output signal and for providing a conditioned output;

a first analog-to-digital converter for receiving said conditioned output; and a second analog-to-digital converter for receiving an integrated output signal from said optical object sensing system.

18. The apparatus of claim 16 further comprising a digital-to-resistance; converter having a variable resistance that is set based on an algorithm using said first digital output, said variable resistance connected into a gain circuit of said preamplifier for controlling the transfer function of said preamplifier.

19. The of claim 16 wherein said controller is adapted to execute an algorithm comprised of the following steps:

(a) read the value of said second digital output and set a parameter LITE to that value;

(b) turn on said optical source;

(c) test said value of LITE against a blanking intensity value and if said value of LITE is greater than said blanking intensity value, proceed to step (1);

(d) read the value of said first digital output;

(e) test said value of LITE against a maximum darkness value, and if said of LITE is less than said maximum darkness value, proceed to step (k);

(f) test said value of LITE against a constant effect value and, if said value of LITE is greater than said constant effect value, proceed to step (j);

(g) use the value of LITE as a variable in an algorithm to set a value for a variable COMP;

(h) subtract: said value of COMP from said first digital output and set a value for a variable INTOUT equal to the result;

(i) stop;

(j) set said value of LITE equal to said constant effect value and proceed to step (g);

(k) set said value of LITE equal to said maximum darkness value an proceed to step (g);

(l) test whether a window in the field of view of the optical detector is higher than a set position and, if so, command said window to retract; and (m) set INTOUT to a null value and proceed to step (i).

20. The apparatus of claim 19, wherein said controller is further adapted to said algorithm by starting execution at step (a) when an express close command is received from a window control mechanism and when a monitor command is received from said obstacle detection mechanism.

21. A for canceling the effect of ambient light in an optical object sensing apparatus comprising:

optically coupling an optical source and detector for monitoring a target area that reflects at least a portion of an optical signal for detection as a received optical signal, said optical detector providing a detector output signal indicative of one characteristic of said received optical signal;

outputting a digital output representative of said detector output signal from a conditioning circuit;

receiving said output from said conditioning circuit at a controller;

determining by raid controller the magnitude of an ambient light-induced signal in said digital output;

outputting a control signal to said conditioning circuit; and adjusting said digital output, by said conditioning circuit, to compensate for said ambient light-induced signal on the basis of said control signal.

22. The method of claim 21 further comprising:

modifying a of said conditioning circuit based on said digital output by controlling a digital-to-resistance converter using an algorithm using said digital output, the resistance of said digital-to-resistance converter incorporated into a gain portion of said conditioning circuit.

23. A method for canceling the effect of ambient light on an optical object sensing system comprising:

optically coup ing an optical source and detector for monitoring a target area that reflects at least a portion of an optical signal for detection as a received optical signal, said optical detector providing a detector output signal indicative of one characteristic of said received optical signal;

receiving said detector output signal at a conditioning circuit;

outputting from said conditioning circuit a first digital output representative of said detector output signal and a second digital output representative of an integrated output signal; and receiving said first and second digital outputs in a controller adapted to determine an effect of the ambient light on said integrated output signal and to output a detection output based upon said first and second digital outputs.

24. The method of claim 23 further comprising:

modifying a gain of said conditioning circuit based on said first digital output by controlling a digital-to-resistance converter using an algorithm using said first digital output, the resistance of said digital-to-resistance converter incorporated into a gain portion of said conditioning circuit.

* * * * *

UNITED STATES PATENT AND TRADEMARK OFFICE
CERTIFICATE OF CORRECTION

PATENT NO. : 6,812,466 B2
DATED : November 2, 2004
INVENTOR(S) : Christopher J. O'Connor et al.

It is certified that error appears in the above-identified patent and that said Letters Patent is hereby corrected as shown below:

Column 14,
Lines 44 and 63, ";" should read -- : --;
Line 47, "&" should read -- a --;
Line 52, "sand" should read -- and --;
Line 57, "two" should read -- to --;

Column 15,
Line 1, "said:" should read -- said --;
Line 12, "said," should read -- said --;
Line 22, "as received" should read -- as a received --;
Line 45, "digital-to-resistance;" should read -- digital-to-resistance --;
Line 50, "The of" should read -- The apparatus of --;
Line 58, "said of" should read -- said value of --;
Line 63, "and," should read -- and --;
Line 67, "subtract:" should read -- subtract --;

Column 16,
Line 5, "an" should read -- and --;
Line 15, "A for" should read -- A method for --;
Line 27, "raid" should read -- said --;
Line 35, "a of" should read -- a gain of --; and
Line 42, "coup ing" should read -- coupling --.

Signed and Sealed this

Fourteenth Day of February, 2006

JON W. DUDAS
*Director of the United States Patent and Trademark Office*